Figure 1:
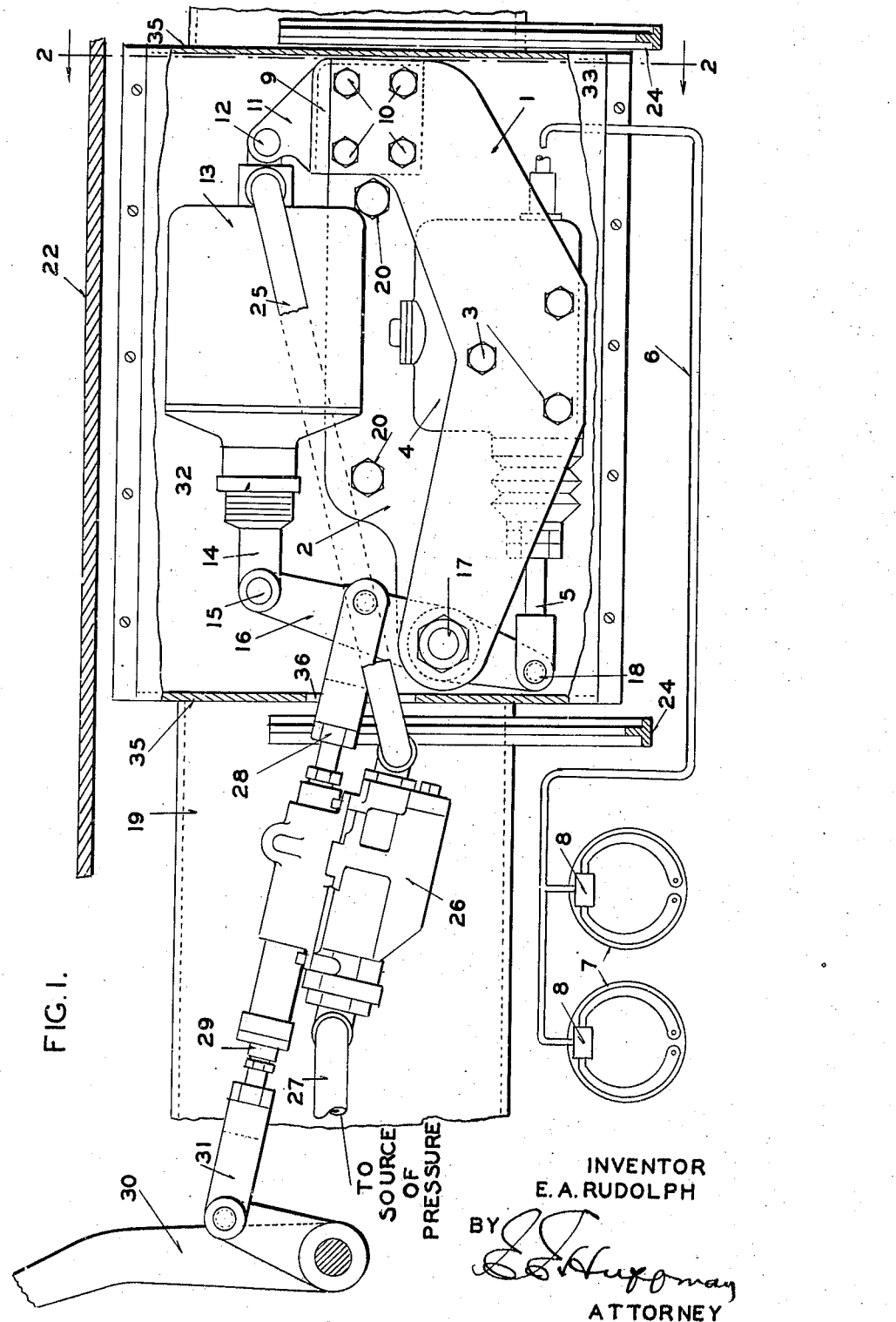

Oct. 21, 1941.　　　E. A. RUDOLPH　　　2,259,832
POWER-ACTUATED APPARATUS
Filed April 10, 1939　　　2 Sheets-Sheet 1

INVENTOR
E. A. RUDOLPH
BY
ATTORNEY

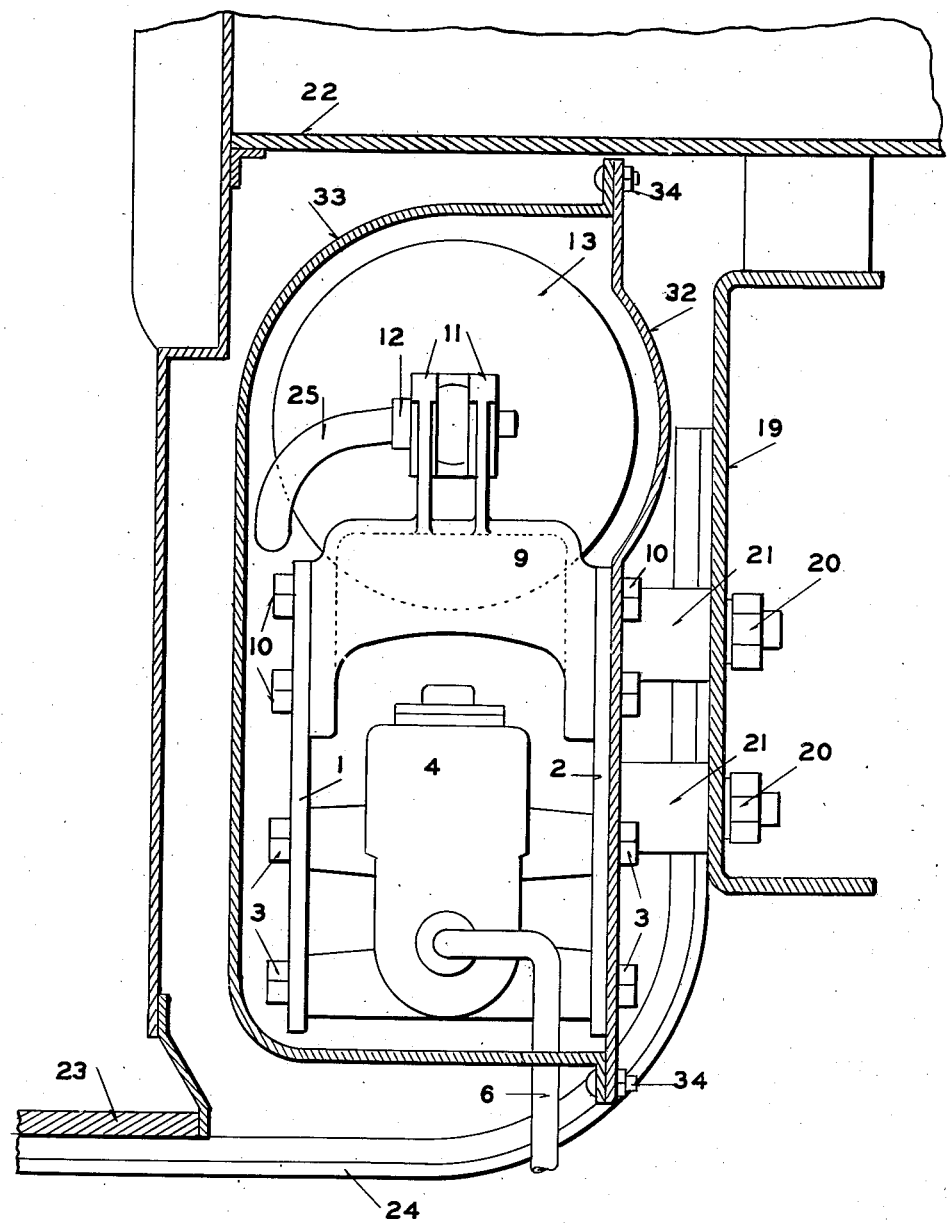

Patented Oct. 21, 1941

2,259,832

UNITED STATES PATENT OFFICE 2,259,832

POWER-ACTUATED APPARATUS

Edward A. Rudolph, St. Louis, Mo., assignor to Wagner Electric Corporation, St. Louis, Mo., a corporation of Delaware Application April 10, 1939, Serial No. 267,061

4 Claims. (Cl. 60—54.6)

My invention relates to power-actuated apparatus and more particularly to the combination of a fluid pressure developing master cylinder and an actuating fluid-operated power cylinder.

One of the objects of my invention is to so associate a master cylinder and an actuating power cylinder that they will form a unitary assembly which can be readily mounted in any convenient place.

Another object of my invention is to so arrange the master cylinder and the power cylinder of the unitary assembly that the operating forces and their reacting forces resulting from operation of the power cylinder and master cylinder will be substantially balanced and thus confined to the assembly, thereby eliminating any undesirable stresses which would tend to force the parts of the assembly out of alignment or to distort the support upon which the assembly is mounted.

Still another object of my invention is to produce an assembly of the kind referred to which has a minimum number of parts, is compact, and which can be enclosed in a simple protection casing.

Other objects of my invention will become apparent from the following description taken in connection with the accompanying drawings in which Figure 1 is a side view, parts being broken away, of a power-actuated apparatus embodying my invention, said apparatus being mounted on a motor vehicle; and Figure 2 is an end view taken on the line 2—2 of Figure 1.

Referring to the drawings, I have shown my unitary assembly as forming a part of a combined air pressure and hydraulic pressure brake actuating system for use on vehicles, but it is to be understood that it may be employed as a part of other actuating systems and that the power cylinder of the unit may be caused to be operated by subatmospheric pressure.

In accordance with my invention, I provide two parallel supporting plates or members 1 and 2 which have interposed therebetween and secured thereto by suitable bolts 3, a master cylinder 4 of well-known construction. The piston (not shown) of the master cylinder is adapted to be actuated by a piston rod 5 whereby fluid under pressure can be forced through the conduit 6 to actuate the wheel brakes 7 by means of fluid motors 8. The supporting members are so formed that the rear ends thereof are positioned slightly above the master cylinder device and bridging these ends is a bracket 9 secured to the members by bolts 10. Integral with the bracket are spaced upstanding ears 11 to which is pivoted, by means of a pin 12, the rear end of a power cylinder 13 within which is reciprocably mounted the usual movable element such as a piston (not shown). The movable element of the power cylinder is connected to a rod 14 which has its outer end pivotally connected by a pin 15 to one end of a lever 16. This lever is centrally pivoted to the forward ends of the supporting members 1 and 2 by means of a pivot bolt 17 and the lower end of the lever is pivotally connected by a pin 18 to the piston rod 5 of the master cylinder.

From the above described construction it is seen that the power cylinder is positioned laterally of the master cylinder and that the axes of the power cylinder and the master cylinder lie in the same plane, which plane is midway between the supporting members 1 and 2. Whenever the power cylinder 13 is caused to be operated, the movable element thereof will transmit force to the end of lever 16. Since the power cylinder is fixed at its rear end, an equal and opposite force will be transmitted to bracket 9 and the rear ends of the supporting members 1 and 2. Force transmitted to lever 16 by the power cylinder will cause a reaction on the pivot bolt 17 of the lever which is in the same direction as the force acting upon the lever from the power cylinder. This force on the bolt 17 will be taken by the supporting members 1 and 2. Since movement of lever 16 causes the piston of the master cylinder to be operated, there will also be created a reaction force on the master cylinder and the supporting members, which reaction force, together with the reaction caused by the power cylinder, will oppose the force at the pivot bolt 17. The forces will tend to balance each other. It is thus seen that the entire arrangement is such that the supporting members 1 and 2 take the reacting forces of the power cylinder and master cylinder when the power cylinder is operated. Also, due to the fact that the axes of the power cylinder and the master cylinder lie in the same plane midway between the supporting members, there will be no lateral stresses upon the supporting members tending to twist them out of alignment. If any unbalancing forces are present at all, they will be parallel to the plane of the axes of the power cylinder and master cylinder.

When the unitary assembly just described is employed on a vehicle braking system, the assembly can be connected to the side rail 19 of the chassis of the vehicle, the securing means comprising bolts 20 having associated therewith spacing members 21 for spacing the supporting member 2 from the rail. The position on the rail at which the unitary assembly is shown as mounted is just below the operator's cab 22 and above the running board 23 which is secured to the rail 19 by brackets 24.

In order that the power cylinder may be properly controlled in the usual manner, there is provided a conduit 25 leading from the rear end of the power cylinder to a control valve 26 connected to the source of pressure by the conduit 27. The valve is of well-known construction and has its casing connected to lever 16 at a point above the pivot bolt 17 by means of an adjustable rod 28. The valve is actuated by a slidable stem 29 which is connected to the brake pedal 30 by a connection 31. The slidable stem has a lost motion connection with the casing of the valve to permit proper operation of the valve whereby fluid under pressure may be admitted to the power cylinder and exhausted therefrom. In the event there should be a failure of the fluid under pressure, the lost motion is taken up and a mechanical connection established between the pedal and the lever 16 whereby the master cylinder may be operated by manual force.

Since the unitary assembly of the power cylinder and master cylinder is mounted upon the chassis of the vehicle and quite closely adjacent the roadway, it is exposed to a considerable amount of dirt and dust and also to any flying obstacles, such as rocks, which may be thrown up by the wheels of the vehicle. To exclude dirt and dust and to properly protect the assembly, I provide it with a casing comprising a backing plate 32 secured to the supporting member 2 by means of the bolts 10 and 3, and a cover 33 which is removably secured to the top and bottom of the backing plate by bolts 34. The cover 33 has end walls 35, the forward one of which is provided with a slot 36 through which the rod 28 and conduit 25 extend.

From the foregoing description it is apparent that I have provided a very compact unitary assembly for the power cylinder and master cylinder wherein the forces resulting from operation of the power cylinder will all lie in a single plane and be taken by the supporting member. Also, the arrangement is such that the forces will tend to balance each other. No forces are set up in the assembly which tend to distort the parts of the assembly or distort the supporting member upon which the assembly is mounted whereby the whole assembly will be thrown out of alignment. The assembly is so constructed that it can be very easily shielded by a simple structure, thus permitting easy access to the assembly.

It is also to be noted that since all the forces are balanced, the assembly is permitted to be mounted upon supports which otherwise would not have sufficient strength to withstand the forces and reactions thereto which would be set up if the power cylinder and master cylinder were mounted separately thereon. The assembly permits the master cylinder and power cylinder to be assembled at the factory where it can be properly checked by experts. To mount the assembly, the mechanic in the field need only find a place which has sufficient space and a support which can accommodate the attaching bolts 20. The assembly can be very conveniently mounted along side the rail below the cab in the manner illustrated, thus employing the use of the space that ordinarily is wasted.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In fluid pressure producing apparatus, a unitary power-actuated assembly for mounting on a support, said assembly comprising a supporting member, a separate and independent master cylinder device including a reservoir, means for securing the master cylinder device to the supporting member, a separate and independent power cylinder, means for pivotally connecting one of the relatively movable elements of the power cylinder to the supporting member, a lever pivoted intermediate its ends to the supporting member, means for pivotally connecting the other relatively movable element of the power cylinder to one end of the lever so that said power cylinder is suspended at its ends and free to bodily pivot on the support when the lever is operated thereby, means pivotally connecting the other end of the lever to the actuating element of the master cylinder, said power cylinder being laterally spaced from the master cylinder device and having its axis substantially parallel with the axis of the master cylinder, and means for detachably connecting the supporting member to the support.

2. In fluid pressure producing apparatus, a unitary power-actuated assembly for mounting on a support, said assembly comprising spaced independent supporting members, a separate and independent master cylinder device including a reservoir, means for securing the master cylinder device between said supporting members, a separate and independent power cylinder, means for connecting one of the relatively movable elements of the power cylinder to the supporting members, a lever for operating the reciprocable piston of the master cylinder device and pivoted between the supporting members, means connecting the other of the relatively movable elements of the power cylinder to the lever, said power cylinder and master cylinder being spaced laterally with respect to each other and having their axes substantially parallel, and means detachably connecting the supporting members to the support.

3. In fluid pressure producing apparatus, a unitary power-actuated assembly for mounting on a support, said assembly comprising spaced independent supporting members, a separate and independent master cylinder device including an integral reservoir positioned between said members, means for securing the master cylinder device to the intermediate portions of said supporting members, a separate and independent power cylinder, means for pivotally connecting one of the relatively movable elements of the power cylinder to one pair of adjacent ends of the supporting members, a lever operatively connected at one end to the reciprocable piston of the master cylinder device and pivoted intermediate its ends to the other adjacent ends of the supporting members, means connecting the other of the relatively movable elements of the power cylinder to the other end of the lever, and means detachably connecting the supporting members to the support.

4. In apparatus of the class described, a unitary power-actuated assembly for mounting on a support and comprising spaced members, an independent master cylinder device positioned between and secured to the intermediate parts of said members, a lever pivotally mounted intermediate its ends to one pair of adjacent ends of the members, means for connecting one end of the lever to the movable actuating element of the master cylinder device, an independent power cylinder positioned laterally with respect to the master cylinder and with its axis substantially parallel with the axis of the master cylinder, a bracket connecting the other pair of adjacent ends of the spaced members, means pivotally connecting the cylinder element of the power cylinder to the bracket, and means connecting the movable element of the power cylinder to the other end of the lever.

EDWARD A. RUDOLPH.